July 7, 1942.  B. A. LINDERMAN  2,288,631
TRANSMISSION MECHANISM
Filed April 22, 1937  2 Sheets-Sheet 1
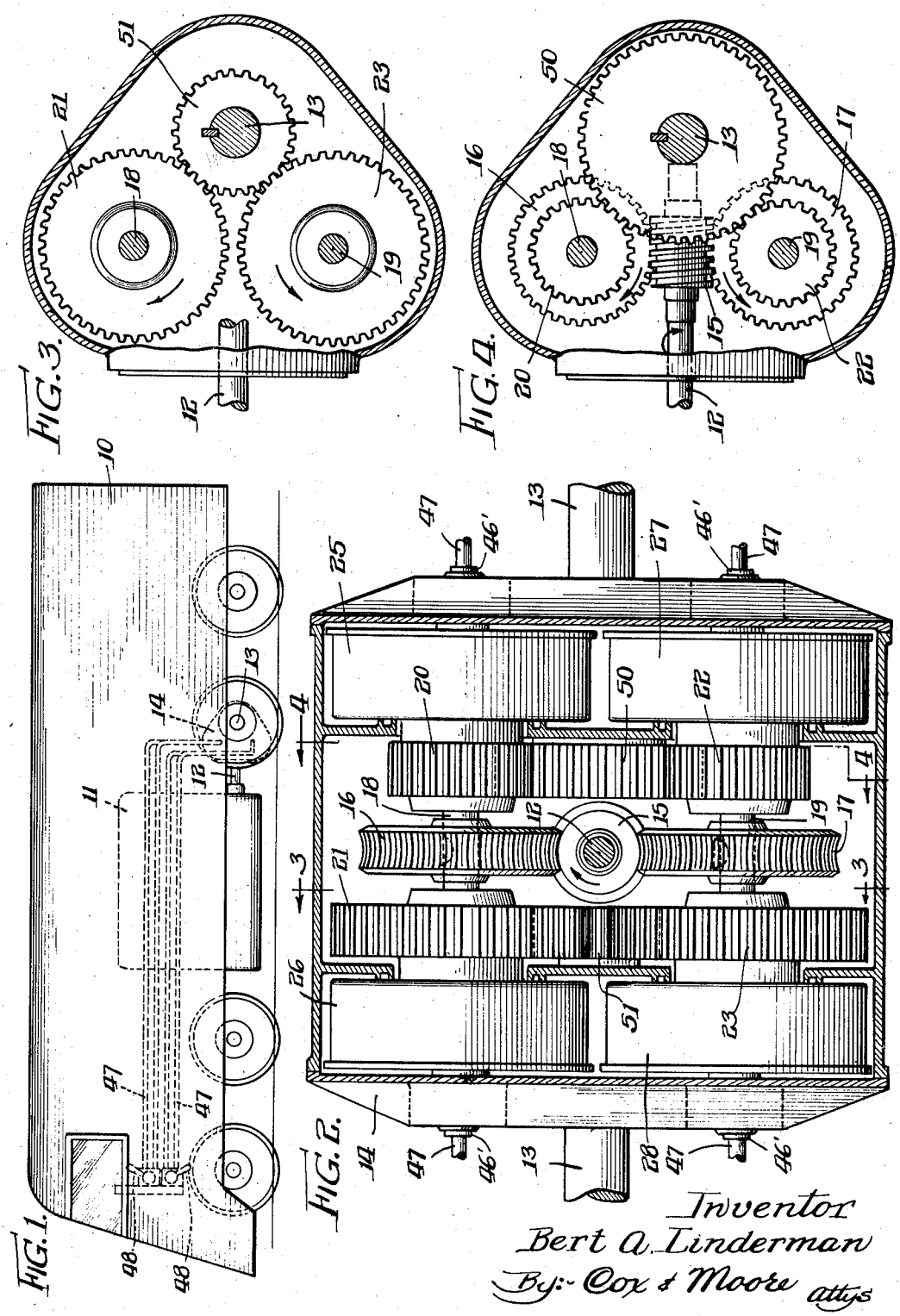

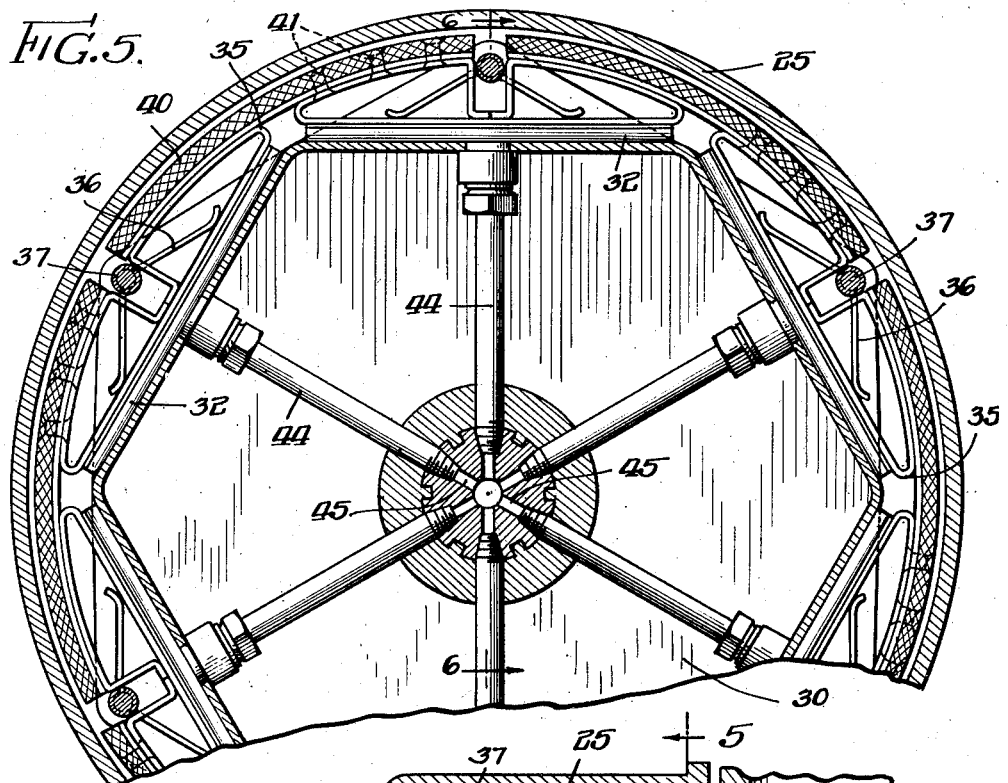
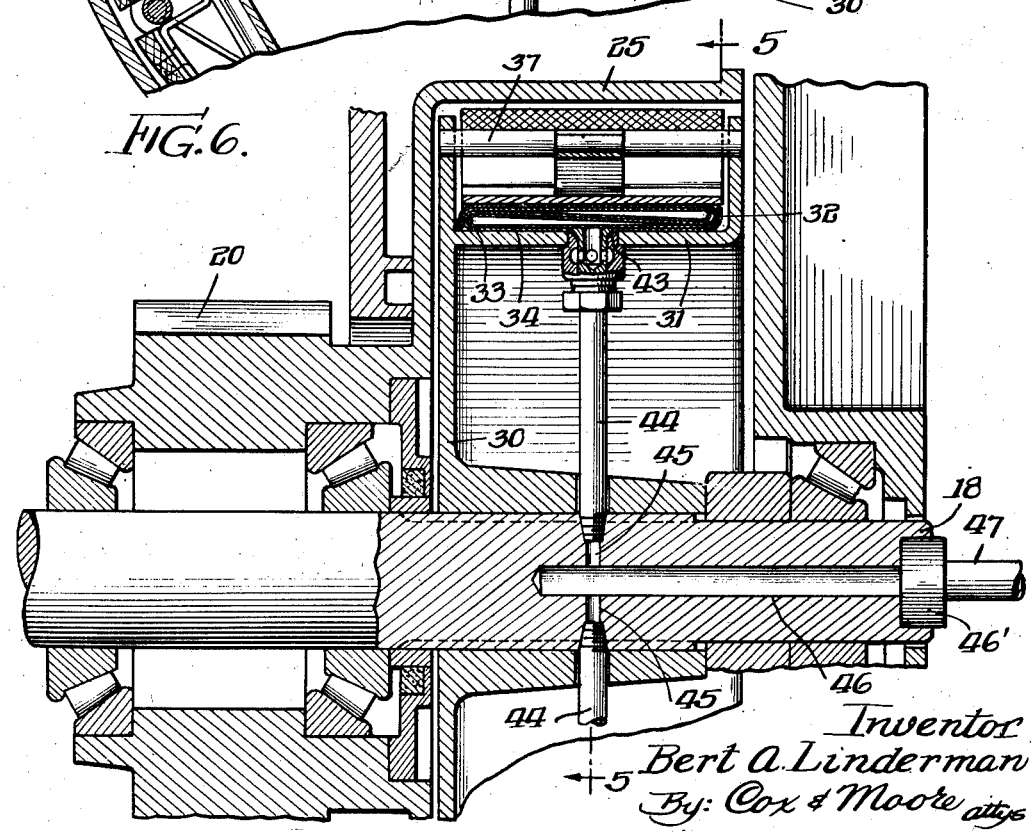

Patented July 7, 1942

2,288,631

UNITED STATES PATENT OFFICE 2,288,631

TRANSMISSION MECHANISM

Bert A. Linderman, Newburgh, N. Y.; D. Jean Louise Linderman, administratrix of said Bert A. Linderman, deceased, assignor to Linderman Devices, Inc., Newburgh, N. Y., a corporation of Delaware Application April 22, 1937, Serial No. 138,385

13 Claims. (Cl. 74—364)

This invention relates to transmission mechanisms, and more particularly to vehicle transmissions of the heavy duty type adapted for traction and like heavy duty service.

It is an object of the invention to provide a transmission mechanism which is inexpensive to construct, and which is durable and reliable in operation. A further object is to provide a transmission which will pick up the drive smoothly without undue shock or strain to the driving or driven parts, and which will not slip when subjected to heavy loads.

More specifically it is an object of the invention to provide a vehicle transmission of the direct drive type which is satisfactory for heavy duty service, such as for traction and like uses. In this connection the transmission mechanism of the present invention provides a direct drive at a plurality of speeds in two directions of travel, either forward or reverse. It also provides a direct driving arrangement wherein the crank shaft of the driving engine or other prime mover may lie at 90 degrees with respect to the axle or other shaft to be driven. It also provides for suitable speed reduction between the engine and the driven axle.

A still further object of the invention is to provide a transmission mechanism of the synchromesh type which may be engaged and disengaged by fluid operated clutches.

Other objects and advantages of the invention will be apparent from the following specification, when taken in connection with the accompanying drawings.

In the drawings, wherein like reference numerals refer to like parts throughout:

Fig. 1 is a side view, somewhat diagrammatic in form, illustrating the invention as applied to a traction vehicle which, in the instance shown, is a railroad locomotive of the Diesel type.

Fig. 2 is a detail view of the transmission mechanism.

Fig. 3 is a sectional view on the line 3—3 of Fig. 2.

Fig. 4 is a sectional view on the line 4—4 of Fig. 2.

Fig. 5 is a partial detail view on the line 5—5 of Fig. 6 showing one of the clutching mechanisms embodied in the transmission, and Fig. 6 is a longitudinal sectional view through the mechanism of Fig. 5, on the line 6—6 thereof.

In the drawings the transmission mechanism of the present invention is shown applied to a traction vehicle or locomotive having a Diesel or other internal combustion driving engine, as the invention is particularly adapted for heavy duty uses of this character, and provides a suitable direct driving mechanism for traction uses. However, it is to be understood that the invention is also adapted for use on other types of vehicles of lighter duty character, and for use generally as a transmission mechanism outside of the vehicle field.

Referring to the drawings, and first to Figs. 1 to 4 inclusive thereof, the traction vehicle or locomotive 10 is illustrated as being provided with a driving engine 11, which may be of the Diesel or other internal combustion type. The engine is provided with a main drive shaft 12 extending longitudinally of the locomotive and at right angles with respect to the transversely disposed wheel axle 13 which is to be driven. The transmission mechanism is illustrated generally at 14 and provides a direct driving means for driving the axle from the engine drive shaft.

The drive shaft 12 has fixed thereon a worm wheel 15 which is in driving relation with a pair of gears 16 and 17 fixed upon the shafts 18 and 19, respectively, of the transmission mechanism. A small gear 20 and a large gear 21 are loosely mounted on the shaft 18 on either side of the gear 16. A similar small gear 22 and large gear 23 are loosely journalled upon the transmission shaft 19. As will be best understood by reference to Fig. 6, the gear 20 is formed integrally with the outer drum member 25 of the clutch assembly illustrated in detail in Figs. 5 and 6. Similarly the gears 21, 22 and 23 are formed integrally with the outer drums 26, 27 and 28 of other clutch assemblies, there being four clutch assemblies of identical construction in the transmission, one mounted at each end of the shafts 18 and 19.

The clutches provide ready and effective means for selectively clutching any one of the gears 20, 21, 22 or 23 for rotation either with transmission shaft 18 or transmission shaft 19, these shafts being in constant operation so long as drive shaft 12 of the engine is rotating. It is to be understood that various forms of clutches may be employed in the transmission, but these clutches are preferably fluid operated and of the type illustrated. Inasmuch as the clutches are the same in construction, a description of one will enable an understanding of them all. As shown in Figs. 5 and 6, the inner frame member 30 of the clutch associated with gear 20 is fixed to the transmission shaft 18 and constantly rotates therewith. This frame member carries a laterally extending flange 31 which is adapted to support a series of diaphragms 32. The flange 31 is polygonally shaped whereby to provide a series of flat surfaces upon which the diaphragms may be mounted. The diaphragms may be of any suitable type, and, as illustrated, are formed of two metal sheets 33 and 34 secured peripherally to form a fluid-tight chamber and reversely bent into general S-shape, as shown in Fig. 6, whereby to provide a plurality of superposed diaphragm sections.

Each diaphragm carries a clutch shoe 35 which is normally urged radially inwardly against the diaphragm by a spring 36. The shoes are constrained for movement in a radial direction only by pins 37 which are secured to the frame 30 of the clutch, each pin forming a radial guiding means for its shoe. The springs 36 are anchored to the pins 37. The clutch shoes carry lining members 40 which are secured to the shoes by means of rivets 41 in the usual manner.

The diaphragms 32 may be expanded to bring the clutch shoes and their associated lining members into clutch engagement with the outer drum 25 by any suitable fluid operated means, such as by compressed air or the like. As illustrated, the lower plate 33 of each diaphragm is provided with an opening 43 which communicates with a conduit 44. There is one conduit 44 for each diaphragm as indicated in Fig. 5. The conduits 44 are threaded into radially disposed passages 45 which are in communication with a longitudinal bore 46 extending axially of the shaft 18. This bore connects through a suitable rotatable bearing connection 46' with a conduit member 47 which runs to the control cab of the locomotive (Fig. 1) where it may be controlled by means of an operating valve 48. As will be seen in Figs. 1 and 2, there is a conduit 47 for each clutch and the two operating valves 48 may be of the two-position type whereby to provide individual control for each conduit. By means of the valves 48 any conduit 47 may be brought into communication with a suitable air pressure source, such as a pressure tank or the like.

As shown in Figs. 2, 3 and 4, the small transmission gears 20 and 22 are in constant driving relation with a large bull gear 50 secured to the axle 13. Likewise the large transmission gears 21 and 23 are in constant meshing relation with a small bull gear 51 also fixed to the axle 13.

In the operation of the construction the crank shaft 12 will be in constant rotation so long as the engine 11 is in operation. The worm gears 16 and 17 and their associated transmission shafts 18 and 19, which are directly geared to the crank shaft, will accordingly also be in constant rotation so long as the engine is in operation. However, it is to be noted that the shafts 18 and 19 will rotate in relatively opposite directions due to their gearing connection with the crank shaft. As indicated in Figs. 3 and 4, the shaft 18 rotates clockwise and the shaft 19 counterclockwise. Normally all four of the clutch mechanisms are released, thus permitting the gears 20, 21, 22 and 23 to remain stationary even though the engine is in operation. Assuming, for example, that it is desired to drive the locomotive at slow speed in the forward direction, the control or operating valve 48 will be manipulated to allow compressed air or other fluid to be introduced into the clutch mechanism associated with the small gear 20. The introduction of the fluid into the diaphragms 32 of this clutch mechanism causes the movement of the clutch shoes radially outwardly into gripping engagement with the clutch drum 25. Inasmuch as the clutch frame 30 and the clutch shoes carried therewith are rigidly fixed to shaft 18 and constrained for rotation therewith, the gripping of the shoes and their associated linings 40 against the clutch drum 25, causes rotation of the drum and its associated gear 20 with the shaft 18. Inasmuch as the gear 20 is in geared relation with the bull gear 50 secured to the vehicle axle 13, the vehicle will be driven forward at slow speed. It is to be understood that at this time all of the other clutches, except that associated with gear 20, are disengaged. When it is desired to drive the vehicle forward at a greater speed, the clutch associated with the larger or high speed gear 21 is operated and the clutch associated with the gear 20 simultaneously released. The large gear 21 causes operation of this bull gear 51 and rotates the vehicle axle in the forward direction at a higher speed. The operation of the locomotive in reverse direction is the same except that in reverse direction either the low speed gear 22 or the high speed gear 23 will effect the driving operation.

It will be seen that my means of the mechanism provided a plurality of driving speeds in each direction can be obtained. All of the transmission gears are in constant meshing relation at all times, or synchromeshed. There can be no clashing of gears in the operation of the construction. Not only does the transmission mechanism provide for driving a transversely disposed vehicle axle from a longitudinally disposed engine crank shaft, but it also provides gear reduction mechanism to provide a suitable speed ratio between the engine crank shaft and the axle. This speed reduction may be made of any desired magnitude by suitable proportioning of the gears. Likewise, if more than two speeds in either direction of travel are desired, the clutching mechanisms may be duplicated to any desired degree.

The fluid operated clutches provide a smooth gripping action which will pick up the drive without shock or strain even in heavy duty installations, and the clutches will not slip after being brought into engagement. The transmission provides for the direct driving of the vehicle axle from a constantly rotating power source, such as an internal combustion engine, without the interposition of electrical motor generator sets or other expensive transmission devices.

It is obvious that various changes may be made in the specific embodiment of the invention set forth for the purposes of illustration. The invention is accordingly not to be limited to the structure shown and desired, but only as indicated in the following claims.

The invention is hereby claimed as follows:

1. A transmission mechanism comprising a drive shaft, a driven shaft, gearing including a plurality of clutches for connecting said shafts in driving relation, said clutches being operable upon selective operation to rotate the driven shaft at different speeds and in forward and reverse directions, and control means for selectively operating said clutches, said gearing also including a plurality of gears driving respective transmission shafts from a common gear arranged in driving relationship with said drive shaft, said transmission shafts extending axially on either side of said first-named gears, and loosely mounted gears on each of the shafts on either side of said first-named gears and in close adjacency therewith, each of said loosely mounted gears having a clutch associated therewith for selective engagement with the transmission shaft.

2. A transmission mechanism comprising a drive shaft, a pair of transmission shafts rotatable in opposite directions thereby, a plurality of gears freely mounted on each of said shafts, fluid operated clutch mechanisms selectively operable to cause rotation of any of said gears with its transmission shaft, and a driven shaft, said driven shaft being in constant geared connection with said gears, said transmission shafts being rotated from said drive shaft by gearing comprising a gear in driving relationship with each of said shafts and disposed in intermediate axial relationship between said first-named gears and being continually operated by a common gear associated with said drive shaft.

3. A transmssion mechanism comprising a drive shaft, a driven shaft, a gearing including a plurality of gears driving respective transmission shafts from a common gear in driving relationship with said drive shaft, said transmission shafts extending axially on either side of said first-named gears, loosely mounted gears on either side of said first-named gears, a fluid operated clutch associated with each of said loosely mounted gears for selective engagement with the transmission shaft, each clutch comprising a plurality of fluid operated diaphragms disposed annularly, a clutch drum arranged about the diaphragms, each diaphragm comprising a plurality of substantially parallel layers of sheet material sealed together and operable to separate upon expansion by internal fluid pressure to urge clutch shoes into clutching engagement with the drum, each of the diaphragms having a radially disposed conduit communicating centrally with said diaphragm and in communication with a header extending axially of the clutch assembly, whereby to supply clutch actuating fluid uniformly to all of said diaphragms.

4. A transmission mechanism comprising a drive shaft, a pair of transmission shafts rotatable in opposite directions thereby, a plurality of gears freely mounted on each of said transmission shafts, said transmission shaft being rotated from said drive shaft by gearing comprising a gear in driving relationship with each of said shafts and disposed in intermediate axial relationship between the first-named gears and continually operated by a common gear associated with said drive shaft, fluid operated clutch mechanisms selectively operable to cause rotation of any of said gears with its transmission shaft, each clutch comprising a plurality of fluid operated diaphragms disposed annularly, a clutch drum arranged about the diaphragms, each diaphragm comprising a plurality of substantially parallel layers of sheet material sealed together and operable to separate upon expansion by internal fluid pressure to urge clutch shoes into clutching engagement with the drum, each of the diaphragms having a radially disposed conduit communicating centrally with said diaphragm and in communication with a header extending axially of the clutch assembly, whereby to supply clutch actuating fluid uniformly to all of said diaphragms.

5. A transmission mechanism comprising a drive shaft, a driven shaft, and gearing for connecting the driven shaft to the drive shaft for rotation in opposite directions, said gearing comprising a pair of transmission shafts adapted for rotation in opposite directions, a transmission shaft gear on each of said transmission shafts for driving the same, a common gear arranged in driving relationship with the drive shaft for driving said transmission shaft gears, said transmission shafts extending axially on either side of the transmission shaft gears, loosely mounted gears on the transmission shafts on either side of the transmission shaft gears and in driving relation with the driven shaft, a clutch associated with each of said loosely mounted gears and adapted to clutch the same to its associated transmission shaft, and control means for selectively operating said clutches.

6. A transmission mechanism comprising a drive member, a driven member, and gearing for connecting the driven member to the drive member for rotation in opposite directions, said gearing comprising a pair of transmission shafts adapted for rotation in opposite directions, a transmission shaft gear on each of said transmission shafts for driving the same, said transmission shaft gears being in driving relationship with the drive member, a loosely mounted gear on one of said transmission shafts, a pair of loosely mounted gears of different size on the other of said transmission shafts disposed on opposite sides of the associated transmission shaft gear, all of said loosely mounted gears being in driving relation with the driven member, a clutch associated with each of said loosely mounted gears and adapted to clutch the same to the associated transmission shaft and control means for selectively operating said clutches.

7. A transmission mechanism comprising a drive shaft, a driven shaft, and gearing for connecting the driven shaft to the drive shaft for rotation in opposite directions, said gearing comprising a pair of transmission shafts adapted for rotation in opposite directions, a transmission shaft gear on each of said transmission shafts for driving the same, a worm gear arranged in driving relationship with the drive shaft for driving said transmission shaft gears, a loosely mounted gear on one of said transmission shafts, a plurality of loosely mounted gears on the other of said transmission shafts, all of said loosely mounted gears being in driving relation with the driven shaft, a clutch associated with each of said loosely mounted gears and adapted to clutch the same to its associated transmission shaft, and control means for selectively operating said clutches.

8. A transmission mechanism comprising a drive member, a driven member, and gearing for connecting the driven member to the drive member for rotation in opposite directions, said gearing comprising a pair of transmission shafts adapted for rotation in opposite directions, said transmission shafts being driven from the drive member, a gear loosely mounted on one of said transmission shafts, a plurality of gears of different sizes loosely mounted on the other of said transmission shafts, all of said loosely mounted gears being in driving relation with the driven member, a clutch associated with each of said loosely mounted gears and adapted to clutch the same to its associated transmission shaft, and control means for selectively operating said clutches, each of said clutches comprising a first clutch member rigidly fixed to the associated loosely mounted gear, a second clutch member rigidly fixed to the associated transmission shaft, and fluid operated means for connecting the clutch members into driving relationship.

9. A transmission mechanism as defined in claim 8 wherein said first and second clutch members are provided with clutching portions disposed radially one within the other, and wherein said fluid operated means is radially expansible to bring said clutching portions into clutching relation.

10. A transmission mechanism as defined in claim 8 wherein said first and second clutch members are provided with clutching portions disposed radially one within the other, and wherein said fluid operated means is substantially continuously disposed circumferentially between said clutching portions and is radially expansible to bring said clutching portions into clutching relation.

11. A transmission mechanism as defined in claim 8 wherein said first and second clutch members are provided with clutching portions disposed radially one within the other, and wherein said fluid operated means comprises a plurality of clutch shoes circumferentially disposed between said clutching portions and radially movable to bring said clutching portions into clutching relation.

12. A transmission mechanism as defined in claim 8 wherein said first and second clutch members are provided with clutching portions disposed radially one within the other, and wherein said fluid operated means comprises a plurality of circumferentially disposed clutch shoes and associated circumferentially disposed diaphragm members arranged between the clutching portions, said shoes and diaphragm members being substantially continuous circumferentially and radially shiftable to bring the clutching portions into clutching relation.

13. A transmission mechanism as defined in claim 8 wherein one of said clutch members is provided with a cylindrically-shaped clutching portion and the other of said clutch members is provided with a polygonally-shaped clutching portion disposed radially within said cylindrical clutching portion, and wherein said fluid operated means comprises a plurality of circumferentially disposed shoes and associated diaphragms adapted to bring said clutching portions into clutching relation.

BERT A. LINDERMAN.